United States Patent
Ceballos et al.

(10) Patent No.: US 8,312,038 B2
(45) Date of Patent: Nov. 13, 2012

(54) CRITERIA BUILDER FOR QUERY BUILDER

(75) Inventors: Ariel Gregorio Ceballos, Livermore, CA (US); Michael Anthony Caruso, Powell, OH (US); Kenneth Klaus, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 406 days.

(21) Appl. No.: 12/338,351

(22) Filed: Dec. 18, 2008

(65) Prior Publication Data

US 2010/0161646 A1   Jun. 24, 2010

(51) Int. Cl.
G06F 7/00 (2006.01)
G06F 17/30 (2006.01)

(52) U.S. Cl. ........................................ 707/769

(58) Field of Classification Search ................. 707/769, 707/999.4, E17.014, 999.004
See application file for complete search history.

(56) References Cited

U.S. PATENT DOCUMENTS

| | | | |
|---|---|---|---|
| 5,428,776 A * | 6/1995 | Rothfield | 1/1 |
| 5,701,456 A * | 12/1997 | Jacopi et al. | 1/1 |
| 6,111,574 A * | 8/2000 | Meek | 715/835 |
| 6,326,962 B1 * | 12/2001 | Szabo | 715/762 |
| 6,341,277 B1 | 1/2002 | Coden et al. | |
| 6,430,556 B1 * | 8/2002 | Goldberg et al. | 1/1 |
| 6,477,527 B2 * | 11/2002 | Carey et al. | 1/1 |
| 6,947,928 B2 | 9/2005 | Dettinger et al. | |
| 7,383,513 B2 * | 6/2008 | Goldberg et al. | 715/763 |
| 7,464,073 B2 * | 12/2008 | Stevens et al. | 1/1 |
| 2001/0049679 A1 * | 12/2001 | Yonaitis | 707/4 |
| 2003/0163455 A1 * | 8/2003 | Dettinger et al. | 707/3 |
| 2005/0004911 A1 * | 1/2005 | Goldberg et al. | 707/7 |
| 2005/0015361 A1 * | 1/2005 | Payton et al. | 707/3 |
| 2005/0015363 A1 * | 1/2005 | Dessloch et al. | 707/3 |
| 2005/0015364 A1 * | 1/2005 | Payton et al. | 707/3 |
| 2005/0015368 A1 * | 1/2005 | Payton et al. | 707/4 |
| 2005/0071752 A1 | 3/2005 | Marlatt | |
| 2006/0224574 A1 * | 10/2006 | Dettinger et al. | 707/3 |
| 2007/0208723 A1 * | 9/2007 | Peterson et al. | 707/4 |
| 2008/0270926 A1 * | 10/2008 | Dettinger et al. | 715/769 |
| 2009/0125131 A1 * | 5/2009 | Eldridge et al. | 700/87 |

OTHER PUBLICATIONS

Urbán, Migel A. Sicilia, et al., "Towards a Unified Query-by-Example (UQBE): UML as a Basis for a Generic Graphical Query Language", Objects and Databases 2000, LNCS 1944, Springer-Verlag, Berlin, Germany, © 2001, pp. 185-196.*

Heer, Jeffrey, et al., "Generalized Selection via Interactive Query Relaxation", CHI 2008, Florence, Italy, Apr. 5-10, 2008, pp. 959-968.*

(Continued)

*Primary Examiner* — Aleksandr Kerzhner
(74) *Attorney, Agent, or Firm* — Squire Sanders (US) LLP (57) ABSTRACT

Systems and methods are provided that programmatically provide a user interface for forming a query, comprising. A query builder displays a first row of query criteria, a second row of query criteria, the second row being logically connected to the first row by a first Boolean connector, and a third row of query criteria, the third row being logically connected to the second row by a second Boolean connector. In response to a user drag-and-drop operation, the query builder nests the third row of query criteria in the second row of query criteria. Thus, a drag-and-drop operation obviates the need for cumbersome groups of parentheses when defining the order of operation of the query.

16 Claims, 6 Drawing Sheets

OTHER PUBLICATIONS

Papakonstantinou, Yannis, et al., "QURSED: Querying and Reporting Semistructured Data", ACM SIGMOD 2002, Madison, WI, Jun. 4-6, 2002, pp. 192-203.*

Morgan, Rhys, "web-based Interactive Database Query Builder", Master of Science Thesis, Dept. of Computer Science, University of Bristol, UK, Sep. 2002, 101 pages.*

Petropoulos, Michalis, et al., "Graphical Query Interfaces for Semistructured Data: The QURSED System", ACM Transactions on Internet Technology, vol. 5, No. 2, May 2005, pp. 390-438.*

Microsoft Computer Dictionary, 5th Edition, Microsoft Press, Redmond, WA, © 2002, p. 359.*

Bergman, Lawrence D., et al., "Drag-and-drop multimedia: an interface framework for digital libraries", International Journal on Digital Libraries, vol. 2, Nos. 2-3, © 1999, pp. 178-189.*

Oracle et al., "Peoplesoft Enterprise Peopletools", Oracle Data Sheet, pp. 1-7, 2007.

* cited by examiner

FIG. 3A criteria_builder

ADD CRITERIA | REMOVE CRITERIA

JOB | IS EQUAL TO
JOB
DEPARTMENT
PERSON
EMAIL
FIRST NAME
LAST NAME
LEVEL
START DATE
ORGANIZATION
MANAGER 310, 320, 330, 300

FIG. 3B criteria_builder

ADD CRITERIA | REMOVE CRITERIA

PERSON | IS EQUAL TO
IS EQUAL TO
IS NOT EQUAL TO
IS GREATER THAN
IS LESS THAN
IS GREATER THAN OR EQUAL TO
IS LESS THAN OR EQUAL TO
CONTAINS
DOES NOT CONTAIN

SELECT OPERATOR

310, 320, 330, 300

FIG. 3C criteria_builder

ADD CRITERIA | REMOVE CRITERIA | PERSON | IS EQUAL TO | LARRY

CRITERIA BUILDER FOR QUERY BUILDER

FIELD OF THE INVENTION

One embodiment is directed a computer application user interface, and more particularly directed to a user interface for assembling groups based on criteria.

BACKGROUND INFORMATION

Software applications, such as Oracle® Human Capital Management (HCM) software, typically provide a user or administrator a user interface for assembling groups. For example, human resources personnel may wish to create a group of employees based on specific criteria such as title or department. Such a group is created by querying a human resources database using a query language comprising operands and comparative operators. In some cases these criteria can get very complex, and such query representations become hard to understand for the average user. Typically, applications have relied on tables that display each criterion as a row and one of the columns in the row (normally the first or the last one) acting as a connector between the different criterion ('AND,' 'OR' or 'NOT'). If any type of nesting is needed, these user interfaces resort to the use of parentheses. At this point, the visual representation by means of a table is barely better than the SQL being created by the interface. For example, the query "(((Title=Manager) and (Department=Research)) or (Salary>$100,000))" becomes very difficult to read in plain format or tabular format because of the multiply-nested parentheses.

SUMMARY OF THE INVENTION

One embodiment is a method for programmatically providing a user interface for forming a query. The method comprises displaying a first row of query criteria, displaying a second row of query criteria, the second row being logically connected to the first row by a first Boolean connector, displaying a third row of query criteria, the third row being logically connected to the second row by a second Boolean connector, in response to a user drag-and-drop operation, nesting the third row of query criteria in the second row of query criteria, and executing a query comprising the first row, the first Boolean connector, and the nested second row and third row including the second Boolean connector.

DETAILED DESCRIPTION

A query builder in accordance with an embodiment improves the readability of query criteria by means of eliminating the use of parenthesis and simplifies editing using drag and drop functionality. The user is able to describe a criteria that groups any two or more criteria rows, arrange any row in any order, include any row within a group of rows, include any group with a parent group and connect any row or group with either an 'AND,' 'OR' or 'NOT.' This interface is visually simple to read, understand and intuitive to manage with groups being represented with visual borders, nested groups having nested borders and the ability for the user to drag and drop rows or groups and move them within the criteria set, including in and out of any other group. The user is able to:

Arrange the rows in any order
Group any two or more rows
Toggle between AND, OR and NOT for any row or group of rows
Move any row into or out of any group
Destroy any group
Move and arrange the groups in any order
Create a new group or move an existing group inside another group In this improved interface the user can intuitively rearrange the criteria.

Figure 1:
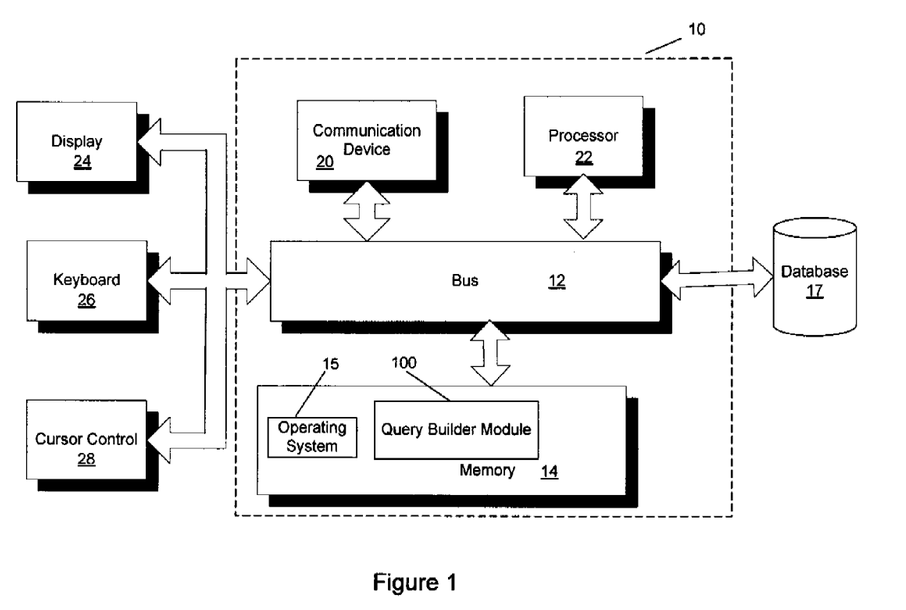
FIG. 1 is a block diagram of a system that can implement a query builder in accordance with an embodiment.

FIG. 1 is a block diagram of a system 10 that can implement an embodiment of a query builder. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System further includes a database 17 for storing additional data. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a Query Builder module 100. This module is described in greater detail below.

Figure 2:
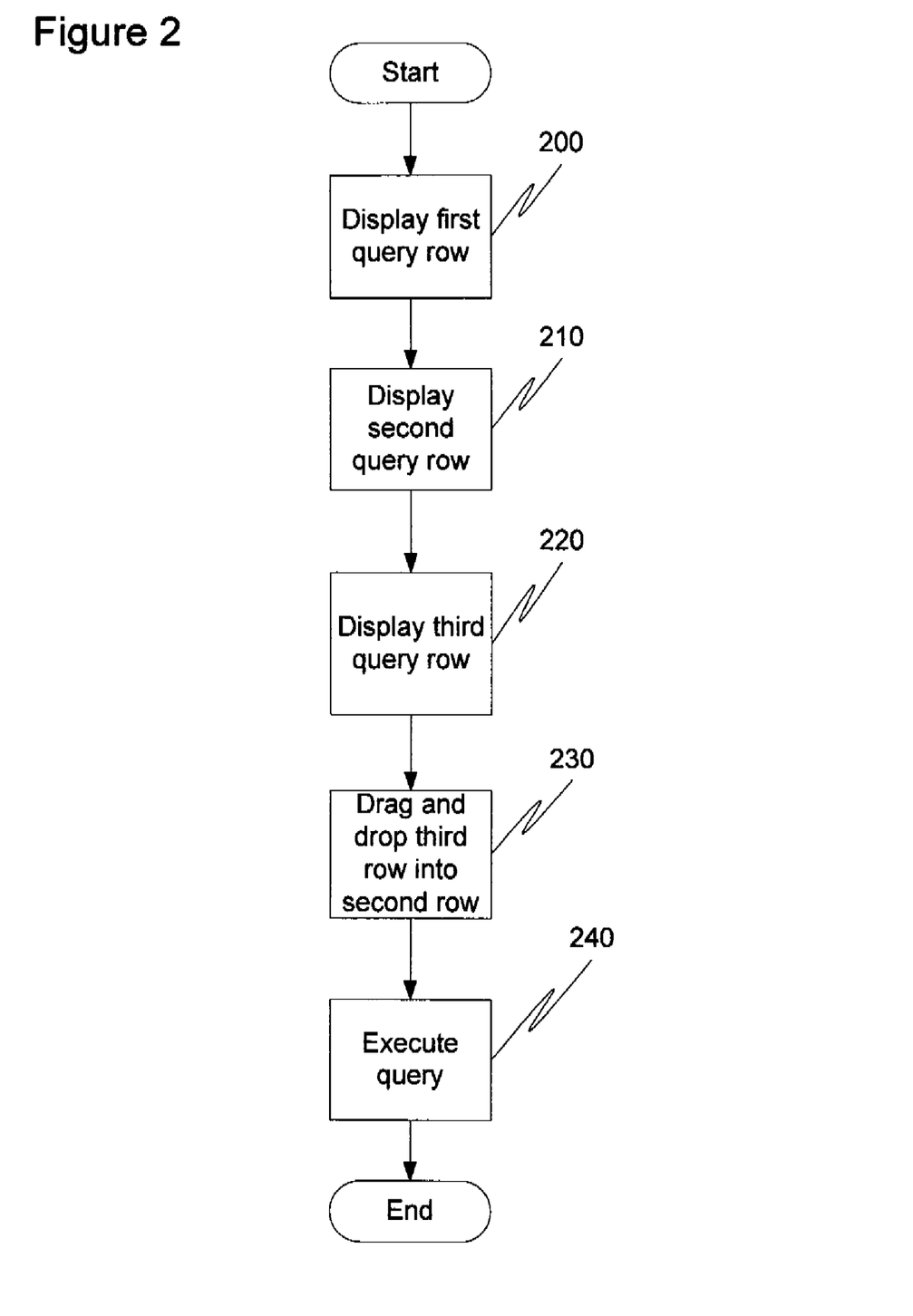
FIG. 2 illustrates a method of providing a graphical query builder.

FIG. 2 illustrates a flow diagram of the functionality of Query Builder module 100 in accordance with an embodiment. In one embodiment, the functionality of the flow diagram of FIG. 2 is implemented by software stored in memory and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. The Query Builder module 100 first displays a first query row to allow a user to enter query criteria (200). In response to a request to add an additional row, the Query Builder module 100 displays a second query row to allow a user to enter query criteria (210). The first query row and second query row are logically connected by a Boolean connector. In response to a request to add an additional row, the Query Builder module 100 displays a third query row to allow a user to enter query criteria (220). The second query row and third query row are logically connected by a Boolean connector. In response to a drag-and-drop operation by the user, Query Builder 100 nests the third row in the second row, such that when executed, a computer will evaluate criteria from the second and third row together before evaluating the same criteria with the criteria from the first row (230). The Query Builder 100 then submits a SQL query for execution based on the criteria entered by the user (240).

Figure 3A:
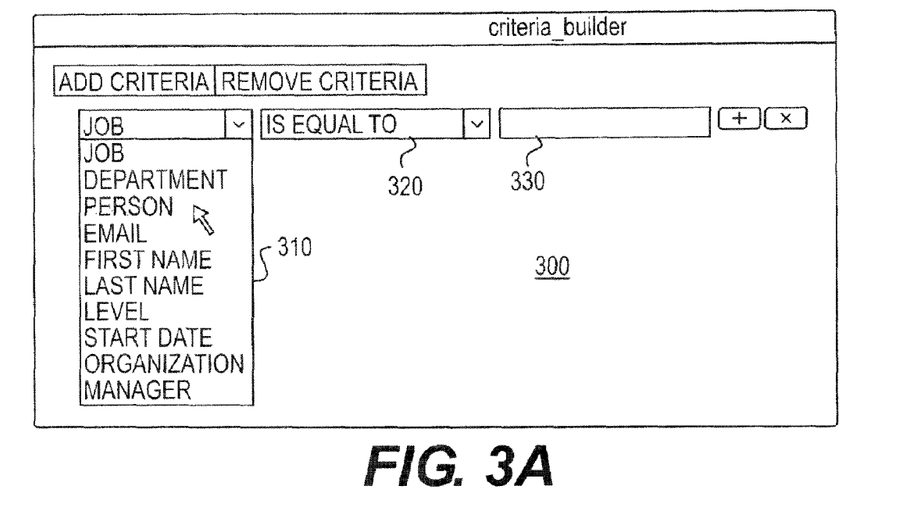
FIG. 3A illustrates an example user interface ("UI") of the graphical query builder in accordance with an embodiment.
Figure 3B:
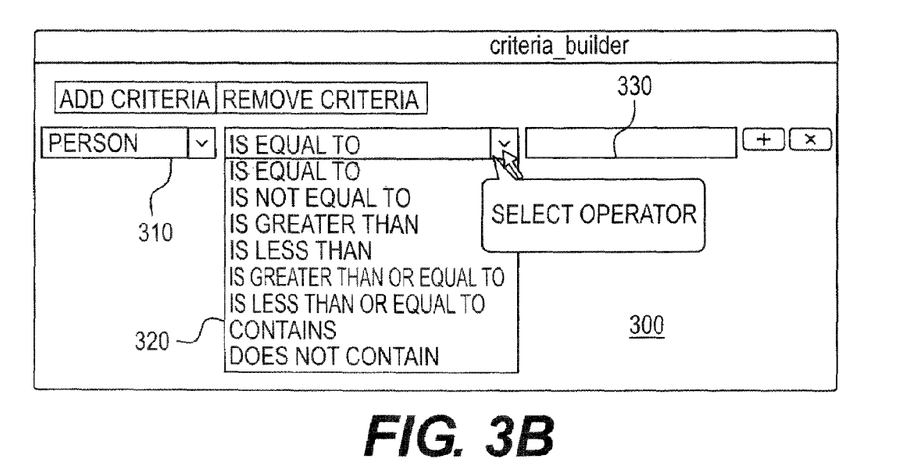
FIG. 3B illustrates another example UI of the graphical query builder in accordance with an embodiment.
Figure 3C:
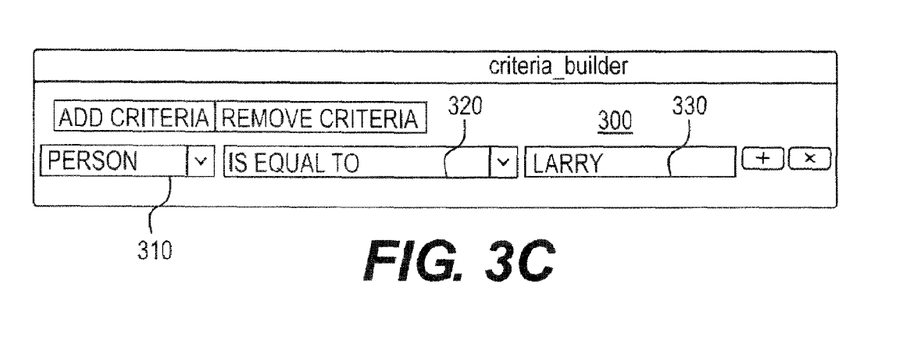
FIG. 3C illustrates yet another example UI of the graphical query builder in accordance with an embodiment.

FIGS. 3A, 3B, and 3C illustrate an example user interface ("UI") 300 for Query Builder module 100. In an embodiment, a user is presented with two drop down menus, operand menu 310 and operator menu 320, and an operand text box 330 for a second operand. FIG. 3A illustrates operand menu 310 and its menu items. Using operand menu 310, the user may select as a first operand one of many categories such as job, department, person, email, first name, last name, level, start date, organization, and manager. One of ordinary skill in the art will recognize various other categories may be added or substituted. FIG. 3B illustrates operator menu 320 and its menu items. Using operator menu 320, the user may select one of many mathematical operators for comparing a first operand to a second operand. A sample, though not exhaustive, list of comparative operators is provided in the table below:

| Operator | Plain Language |
|---|---|
| = | is equal to |
| ≠ | is not equal to |
| > | is greater than |
| < | is less than |
| ≥ | is greater than or equal to |
| ≤ | is less than or equal to |
| ⊇ | contains |
| ⊉ | does not contain |

FIG. 3C illustrates operand text box 330, where a user has entered the word "Larry" in operand text box 330. The resulting query is (Person=Larry), and would return all individuals in the database with "Larry" in their name.

Figure 4A:
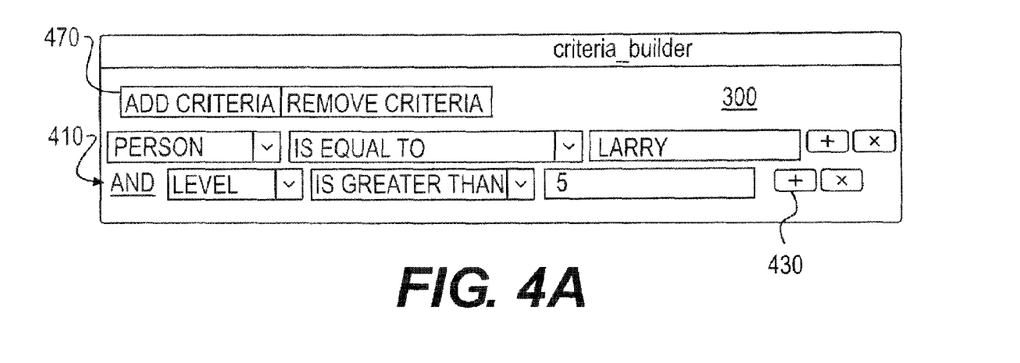
FIG. 4A illustrates adding criteria in an example UI of the graphical query builder in accordance with an embodiment.
Figure 4B:
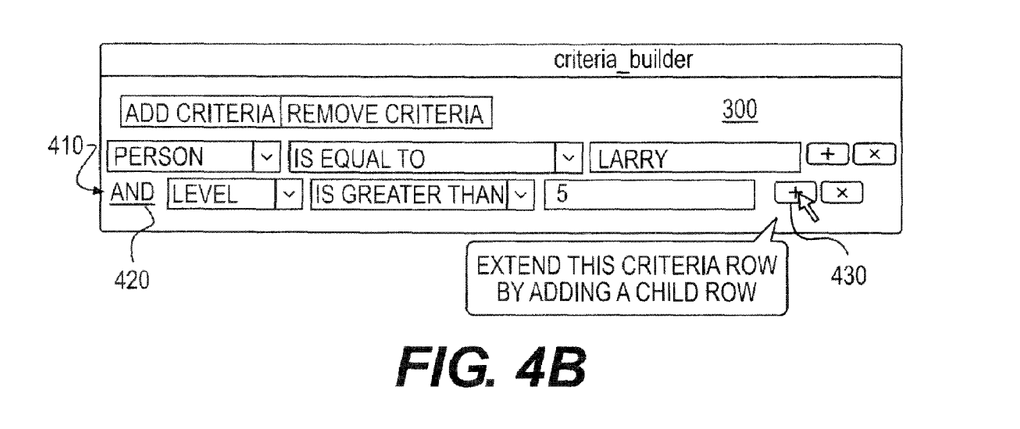
FIG. 4B illustrates extending row criteria in an example UI of the graphical query builder in accordance with an embodiment.
Figure 4C:
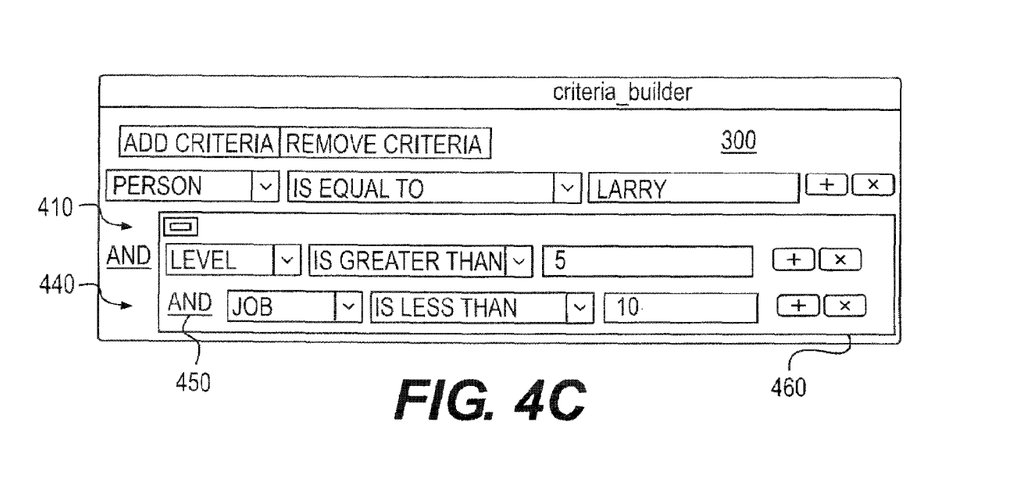
FIG. 4C illustrates nested rows in an example UI of the graphical query builder in accordance with an embodiment.

FIGS. 4A, 4B, and 4C illustrate additional screenshots of example UI 300 for Query Builder module 100. In these example screenshots, the user has added another row of criteria to the query via add criteria button 470. Row 410 includes criteria requiring that the "Level" category have a value greater than 5. This criteria is added to the criteria from FIG. 3C via Boolean operator 420. The resulting query is (Person=Larry) AND (Level>5), which would return all people with Larry in their name and having a level greater than 5. FIG. 4B illustrates extend button 430, which allows a user to extend the corresponding row (here, row 410) by adding a child row of more criteria. This row will be nested with its parent row. FIG. 4C illustrates the addition of the new row using extend button. Row 440 adds to the criteria in row 410 via Boolean connector 450. Rows 410 and 440 are grouped together by box 460. The resulting query is (Person=Larry) AND ((Level>5) AND (Job<10)), which would return all people with Larry in their name and having a level greater than 5 and a job less than 10.

Figure 5:
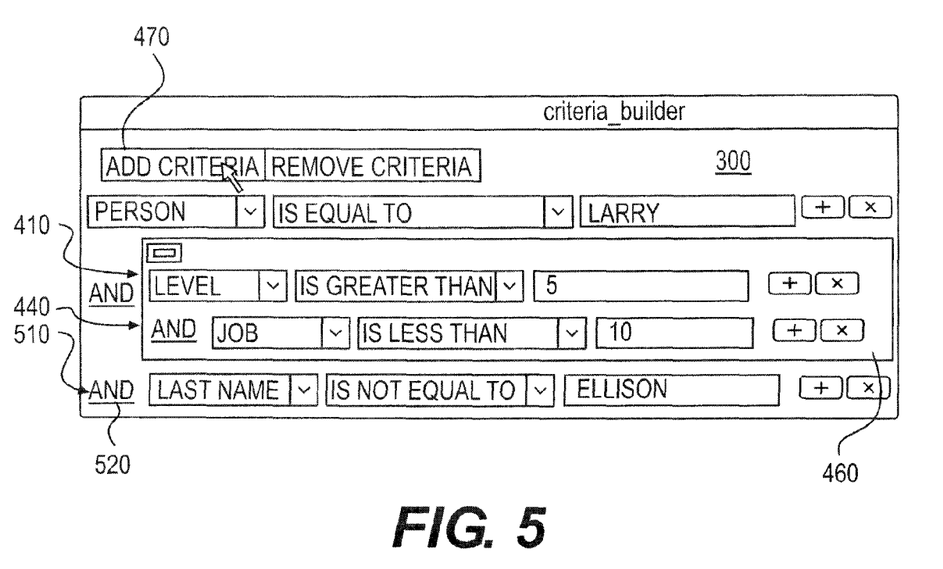
FIG. 5 illustrates yet another example UI of the graphical query builder in accordance with an embodiment.

FIG. 5 illustrates an additional screenshot of example UI 300 of Query Builder module 100. Example UI 300 illustrates that a user has added another row of criteria, row 510, using the add criteria button 470. Row 510 adds to the criteria in FIG. 4C via Boolean connector 520. The resulting query is (Person=Larry) AND ((Level>5) AND (Job<10)) AND (Last Name≠Ellison), which would return all people with Larry in their name and having a level greater than 5 and a job less than 10, though no one with Ellison as their last name.

Figure 6A:
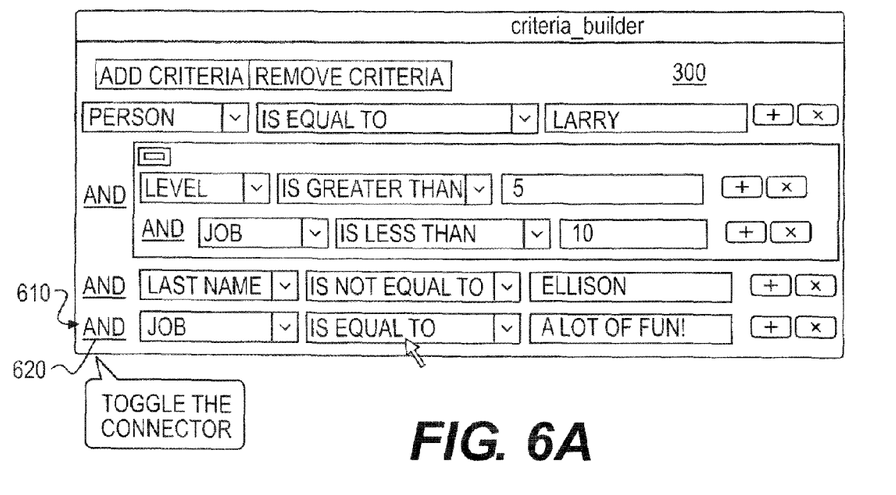
FIG. 6A illustrates yet another example UI of the graphical query builder in accordance with an embodiment.
Figure 6B:
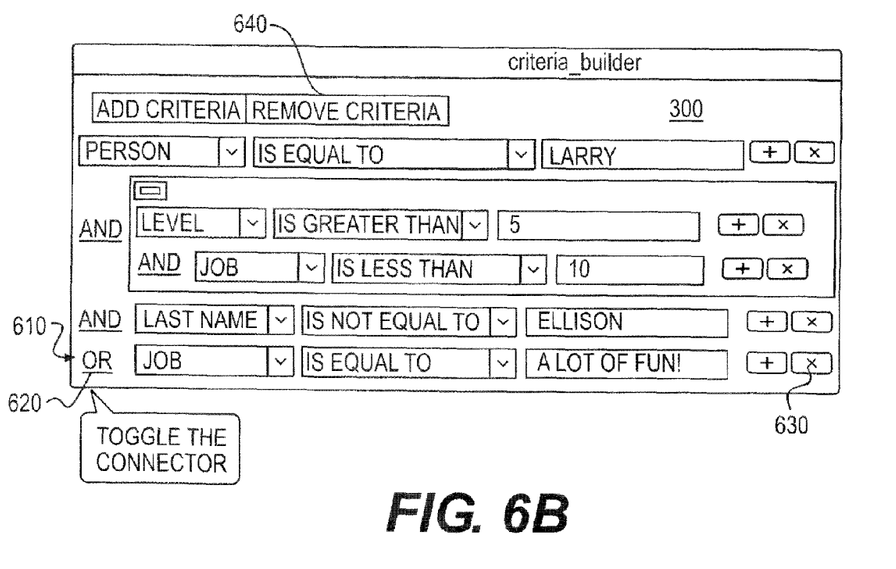
FIG. 6B illustrates toggling a Boolean connecting in an example UI of the graphical query builder in accordance with an embodiment.

FIGS. 6A and 6B illustrate additional screenshots of example UI 300 of Query Builder module 100. Example UI 300 illustrates that a user has added another row of criteria, row 610, using the add criteria button 470. Row 610 adds to the criteria in FIG. 5 via Boolean connector 620. The resulting query is ((Person=Larry) AND ((Level>5) AND (Job<10)) AND (Last Name≠Ellison)) AND (Job='a lot of fun'), which would return all people with Larry in their name and having a level greater than 5 and a job less than 10 and equal to 'a lot of fun,' though no one with Ellison as their last name. By clicking on Boolean connectors, such as Boolean operator 620, the user may toggle the Boolean connector between 'AND,' 'OR' and 'NOT.' FIG. 6B illustrates the criteria in FIG. 6A after the user has toggled Boolean connector 620. The resulting query is ((Person=Larry) AND ((Level>5) AND (Job<10)) AND (Last Name≠Ellison)) OR (Job 'a lot of fun'), which would return all people with Larry in their name and having a level greater than 5 and a job less than 10,' though no one with Ellison as their last name, or all people whose job equals 'a lot of fun.' Furthermore, the user may decide that (Job='a lot of fun') is not good criteria for a query and remove the criteria in row 610 using delete criteria button 630, which removes the row in which the delete criteria button 630 appears. Alternatively, a user may use remove criteria button 640 to simply remove the last row added. After row 610 is removed, the example UI 300 appears as it does in FIG. 5.

In an embodiment, a user may move rows and nest rows via drag-and-drop operations. For example, in FIG. 5. a user may select row 510 by clicking anywhere within the row and dragging the criteria into box 460. The result of this operation would nest row 510 with rows 410 and 440. The resulting query would be (Person=Larry) AND ((Level>5) AND (Job<10) AND (Last Name≠Ellison)). Though the move in this particular example does not change of the outcome of the query, the outcome may be very different if Boolean connector 520 were an 'OR' or 'NOT.' In addition to moving single rows into a box (e.g., box 460), a user may also drag boxes of rows into another box. Furthermore, a user may drag boxes and rows up and down to change the order of the rows and boxes of rows.

Accordingly, the criteria builder provides a graphical user interface that gives the user the ability to create complex queries, a feature which is typically traded for ease of use. Furthermore, unlike conventional systems, the criteria builder allows a user to create complex queries without the mathematical knowledge of parentheses and order of operation, or the computational knowledge of SQL. Moreover, the drag-and-drop feature of row movement and nesting makes forming and altering queries quick and easy.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A method for programmatically providing a user interface for forming a query, comprising:
    displaying a first row of query criteria, wherein the query criteria comprises a first operand, a second operand, and a comparative operator for comparing the first operand with the second operand;
    displaying a second row of query criteria, the second row being logically connected to the first row by a first Boolean connector;
    displaying a third row of query criteria, the third row being logically connected to the second row by a second Boolean connector;
    displaying a fourth row of query criteria;
    displaying the second row and third row together in a bounded area, wherein the bounded area indicates that the second row and the third row are on a child level from the first row, and that the query criteria from the second row and third row will be evaluated together before the query criteria from the first row;
    in response to a user drag-and-drop operation comprising moving the fourth row within the bounded area, nesting the fourth row of query criteria with the second row and third row of query criteria; and
    executing a query comprising evaluating the query criteria from the second row, third row, and fourth row together before evaluating the query criteria from the first row, wherein nested query criteria are evaluated before query criteria that are not nested.

2. The method of claim 1, wherein the first operand and the comparative operator are selected from a drop-down menu.

3. The method of claim 1, wherein the bounded area comprises a box.

4. The method of claim 1, wherein each of the first and second Boolean connectors is one of an 'AND' operator, or an 'OR' operator.

5. The method of claim 4, wherein, in response to a user selection of each of the first and second Boolean connectors, each of the first and second Boolean connectors toggles between 'AND,' and 'OR'.

6. The method of claim 1, further comprising displaying a delete button in each of the first, second and third rows, wherein, in response to a user selection of the delete button, the corresponding row is removed.

7. A non-transitory computer-readable medium having instructions stored thereon that, when executed by a processor, cause the processor to programmatically provide a user interface for forming a query by:
    displaying a first row of query criteria, wherein the query criteria comprises a first operand, a second operand, and a comparative operator for comparing the first operand with the second operand;
    displaying a second row of query criteria, the second row being logically connected to the first row by a first Boolean connector;
    displaying a third row of query criteria, the third row being logically connected to the second row by a second Boolean connector;
    displaying a fourth row of query criteria;
    displaying the second row and third row together in a bounded area, wherein the bounded area indicates that the second row and the third row are on a child level from the first row, and that the query criteria from the second row and third row will be evaluated together before the query criteria from the first row;
    in response to a user drag-and-drop operation comprising moving the fourth row within the bounded area, nesting the fourth row of query criteria with the second row and third row of query criteria; and
    executing a query comprising evaluating the query criteria from the second row, third row, and fourth row together before evaluating the query criteria from the first row, wherein nested query criteria are evaluated before query criteria that are not nested.

8. The computer-readable medium of claim 7, wherein the first operand and the comparative operator are selected from a drop-down menu.

9. The computer-readable medium of claim 7, wherein the bounded area comprises a box.

10. The computer-readable medium of claim 7, wherein each of the first and second Boolean connectors is one of an 'AND' operator, or an 'OR' operator.

11. The computer-readable medium of claim 10, wherein, in response to a user selection of each of the first and second Boolean connectors, each of the first and second Boolean connectors toggles between 'AND,' and 'OR'.

12. A system, comprising:
    a memory containing at least one application;
    a processor communicably connected to the memory and which, when executing the application, performs an operation of generating a graphical user interface for forming queries, the operation comprising:
        displaying a first row of query criteria, wherein the query criteria comprises a first operand, a second operand, and a comparative operator for comparing the first operand with the second operand;
        displaying a second row of query criteria, the second row being logically connected to the first row by a first Boolean connector;
        displaying a third row of query criteria, the third row being logically connected to the second row by a second Boolean connector;
        displaying a fourth row of query criteria;
        displaying the second row and third row together with an indicator, wherein the indicator indicates that the second row and the third row are on a child level from the first row, and that the query criteria from the second row and third row will be evaluated together before the query criteria from the first row;
        in response to a user drag-and-drop operation comprising moving the fourth row within the indicator, nesting the fourth row of query criteria with the second row and third row of query criteria; and
        executing a query comprising evaluating the query criteria from the second row, third row, and fourth row together before evaluating the query criteria from the first row, wherein nested query criteria are evaluated before query criteria that are not nested.

13. The system of claim 12, wherein the indicator area comprises a box.

14. The system of claim 13, wherein the first operand and the comparative operator are selected from a drop-down menu.

15. The system of claim 12, the operation further comprising displaying a delete button in each of the first, second and third rows, wherein, in response to user selection of the delete button, the corresponding row is removed.

16. A system providing a user interface for forming a query, comprising:

storing means for storing at least one application;

processing means for performing an operation of generating the user interface for forming the query, the processing means comprising:

means for displaying a first row of query criteria, wherein the query criteria comprises a first operand, a second operand, and a comparative operator for comparing the first operand with the second operand;

means for displaying a second row of query criteria, the second row being logically connected to the first row by a first Boolean connector;

means for displaying a third row of query criteria, the third row being logically connected to the second row by a second Boolean connector;

means for displaying a fourth row of query criteria;

means for displaying the second row and third row together in a bounded area, wherein the bounded area indicates that the second row and the third row are on a child level from the first row, and that the query criteria from the second row and third row will be evaluated together before the query criteria from the first row;

means for nesting the fourth row of query criteria with the second row and third row of query criteria in response to a user drag-and-drop operation that comprises moving the fourth row within the bounded area; and     means for executing a query comprising evaluating the query criteria from the second row, third row, and fourth row together before evaluating the query criteria from the first row, wherein nested query criteria are evaluated before query criteria that are not nested.

\* \* \* \* \*

UNITED STATES PATENT AND TRADEMARK OFFICE
CERTIFICATE OF CORRECTION

PATENT NO. : 8,312,038 B2
APPLICATION NO. : 12/338351
DATED : November 13, 2012
INVENTOR(S) : Ceballos et al.

It is certified that error appears in the above-identified patent and that said Letters Patent is hereby corrected as shown below:

In column 4, line 38-39, delete "(Job 'a lot of fun')," and insert -- (Job='a lot of fun'), --, therefor.

In column 4, line 51, delete "FIG. 5." and insert -- FIG. 5, --, therefor.

Signed and Sealed this
Fifth Day of February, 2013

Teresa Stanek Rea
*Acting Director of the United States Patent and Trademark Office*